Figure 7:
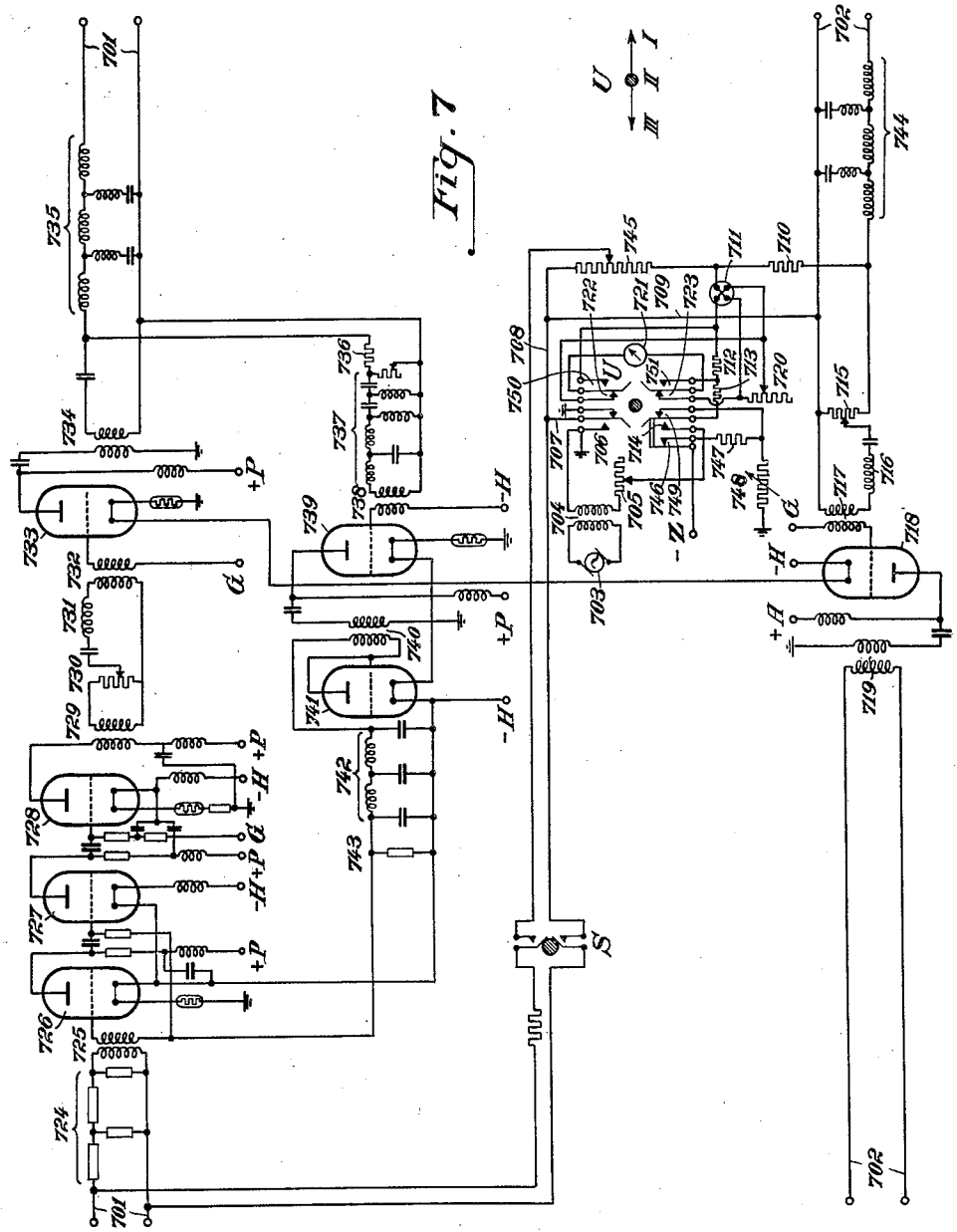

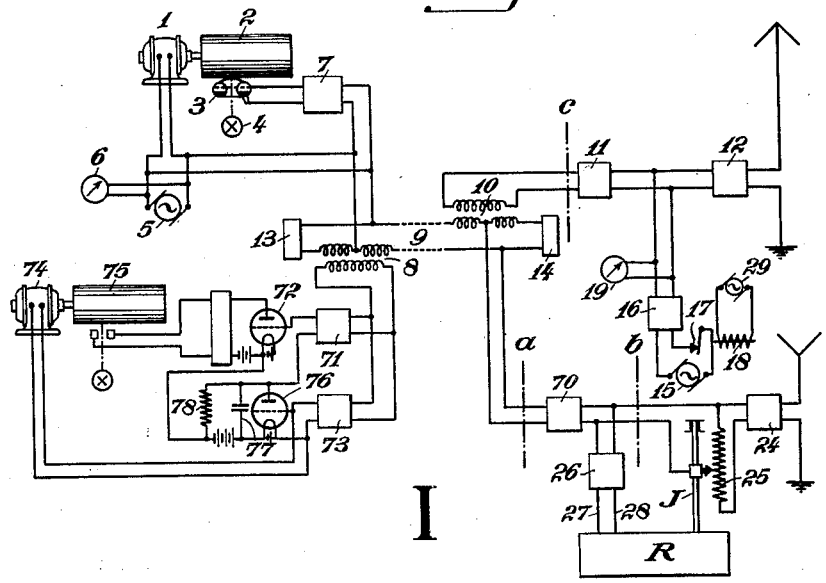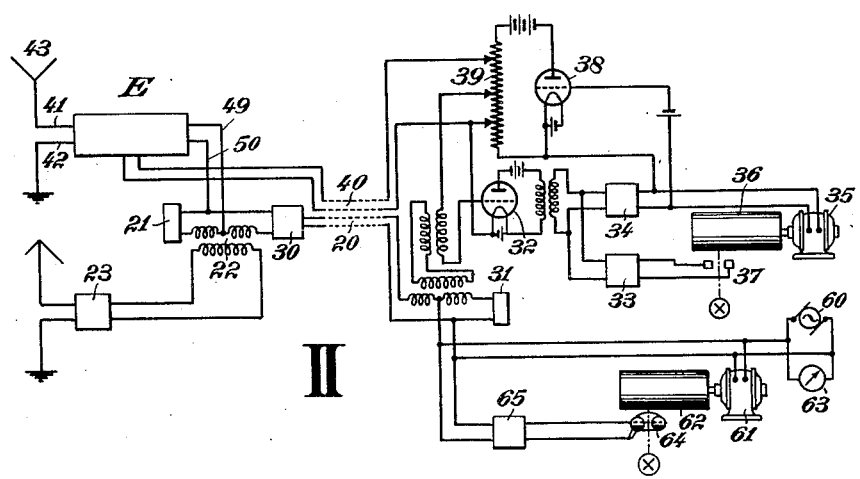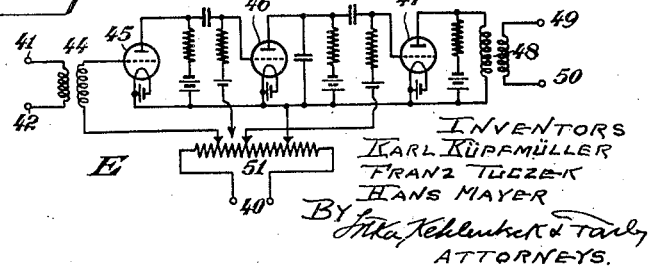

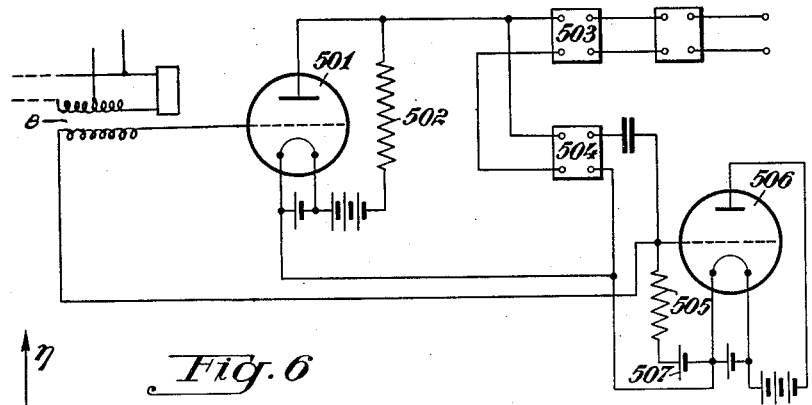
Fig. 5
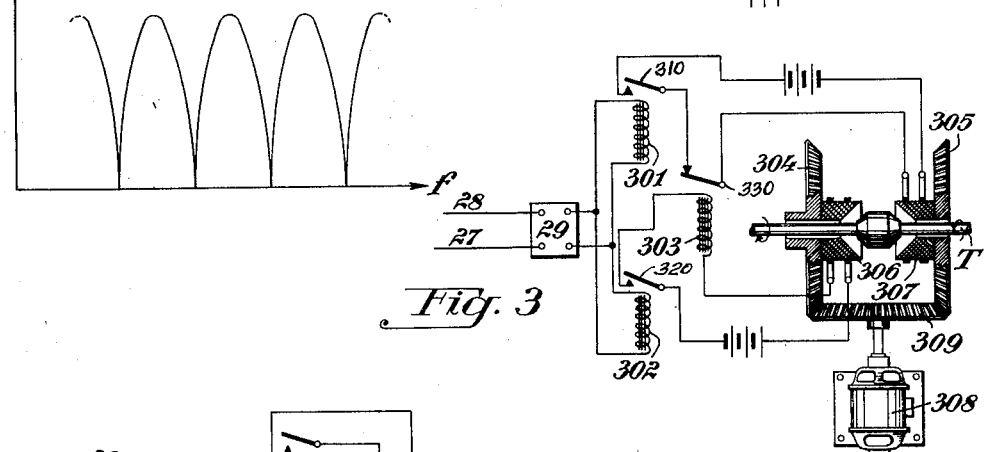
Fig. 6
Fig. 3
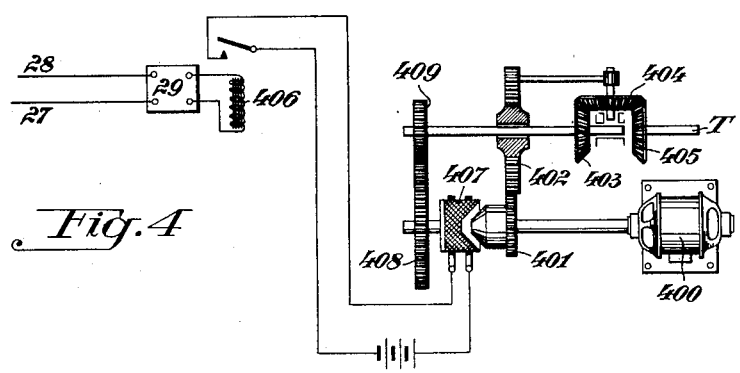
Fig. 4

Nov. 26, 1929.   K. KÜPFMÜLLER ET AL   1,737,503
CONTROL OF THE TRANSMISSION EFFICIENCY
Filed May 28, 1928   4 Sheets-Sheet 4
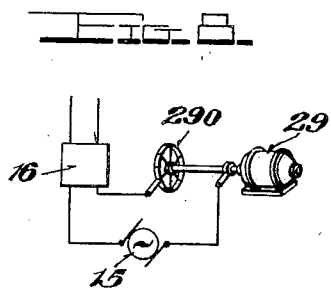
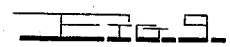
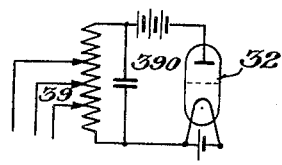
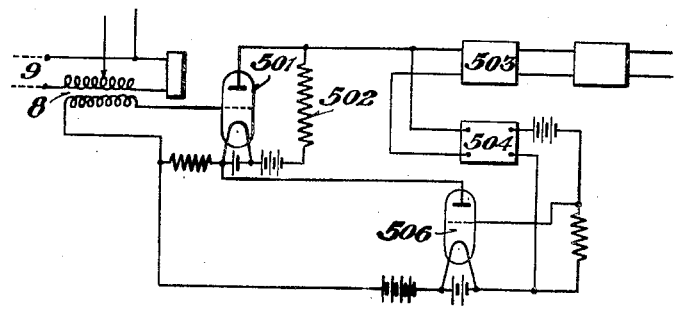

Patented Nov. 26, 1929

1,737,503

UNITED STATES PATENT OFFICE

KARL KÜPFMÜLLER, OF BERLIN-FRIEDENAU, AND FRANZ TUCZEK, OF BERLIN, AND HANS MAYER, OF BERLIN-CHARLOTTENBURG, GERMANY, ASSIGNORS TO SIEMENS & HALSKE AKTIENGESELLSCHAFT, OF SIEMENSSTADT, NEAR BERLIN, GERMANY, A CORPORATION OF GERMANY

CONTROL OF THE TRANSMISSION EFFICIENCY

Application filed May 28, 1928, Serial No. 281,183, and in Germany April 21, 1927.

Applications for patents on this invention have been filed in Germany, April 21, 1927; May 25, 1927; May 28, 1927; August 31, 1927; October 8, 1927; in England, April 5, 1928; April 10, 1928, April 11, 1928; in Belgium, December 30, 1927; in France, December 28, 1927; in Italy, November 30, 1927; in the Netherlands, November 15, 1927; in Sweden, November 5, 1927; and in Austria, December 29, 1927.

Our invention relates to signalling systems, more particularly to systems working with carrier frequencies, such as wireless signalling systems for telephony, telegraphy, picture transmission and the like.

The object of the invention is the automatic control of the transmission efficiency between a transmitter and a receiver. The transmission efficiency between stations apart from one another varies in general in the course of time, for instance, in the case of wireless transmission in consequence of the fading effect or because waves pass on different ways from the transmitter to the receiver and interfere there with one another. The variations in the incoming current intensity then produced are avoided according to this invention.

In the case of duplex working there is a path from the first transmitter to the receiver of the opposite station and back from the second transmitter assigned to this receiver, to a second receiver co-operating with the first transmitter. On this path, briefly called feed-back path, currents may flow, which being sufficiently strong, may cause the system in its totality to be unstable or to excite itself. The transmission efficiency on this path should be kept below a well-defined limit.

The currents passing from the transmitters to the receivers, i. e. in wireless systems from the sending to the receiving aerials, contribute substantially to the overall attenuation. In order to avoid feed-back on the path described, provision has been made to interrupt the speech direction not utilized with the aid of relays. Such arrangements have the draw-back that special amplifiers are required in order to ensure that the signal current intensity be under all circumstances sufficient to operate the relay. Then there is the further risk that the devices respond to any disturbances.

Our invention indicates a method and an arrangement in which the transmission efficiency between a transmitter and a receiver, for instance the attenuation of the feed-back circuit in a duplex system, is automatically maintained above a given value. The proceeding is such that simultaneously with the speech frequency band, a control current is transmitted which, comprises one or several frequencies situated above or below this band and which with the aid of a relay device in the receiver adjusts a controlling device, such as an adjustable resistance device in the transmission circuit in such a manner that the overall attenuation of the whole transmission path or of either of the two transmission paths remains constant.

The control current need only have one frequency, if the transmission efficiency of the system is substantially the same for the control frequency as for the signal frequencies to be transmitted. In the case of wireless systems, this holds good practically only when the variations in the transmission efficiency are produced by a different absorption of the waves on the transmission path. A second type of efficiency fluctuations is produced by the interference of two waves which reach the receiver by different ways. In this case the transmission efficiency $n$ may be caused to depend on the frequency $f$ in the manner shown by Fig. 6. If the control frequency should happen to be in proximity to a point of the curve where its value is zero, this would result in a faulty control of the receiver.

If such disturbances are to be expected, use should be made of a mixed frequency instead of a single control oscillation. This mixture can be produced, for instance, by modulating the control oscillation or by effecting steady periodical variations of the control frequency between two given frequencies, that is by frequency modulation. If these variations are effected so quickly that the control device in the receiver cannot follow them on account of its inertia, the control will adjust itself to a mean efficiency within the frequency band utilized for the control. In transmission systems working with synchronism at the transmitting and receiving stations, and, transmitting synchronization currents, in addition to the communication currents to that end through the transmission paths, such synchronization currents as are lying outside the frequency range of the useful currents, can simultaneously be utilized as control currents. More particularly this will be the case in transmission systems for picture telegraphy, and television as well as for phonofilms. At the receiving end, the control currents are filtered out and operate a relay device. For this end, the source of the synchronization currents should be made to supply currents of constant amplitude.

A smaller inertia of the controlling process is obtained by a purely electrical control than by one involving mechanical relays and controlling devices working in themselves. For this reason the present arrangement becomes particularly suitable for high-speed wireless transmission, for instance of picture currents.

The relay device operated by the control currents preferably comprises a three-electrode valve, in one circuit of which, preferably in the plate circuit, an impedance is mounted, preferably in combination with smoothing means,—as for instance in the case of the so-called echo-suppressors and amplitude limiting devices—which is situated at the same time in the grid circuit or circuits of a thermionic valve set, used as resistance device, through which pass the useful currents. According to the incoming control current intensity the grid bias of the valve set situated in the useful circuit, will be displaced, thus modifying the transmission efficiency of the useful circuit in such a manner that it decreases with the increase of the incoming control current intensity and inversely.

The control of the transmission efficiency can thereby be achieved either at a point in the receiving circuit which is only traversed by the useful currents, that is to say, behind the selective means filtering out the useful currents, or at a point passed by useful and control currents, that is in front of the point at which the useful and control currents are separated from one another, in the direction of transmission.

In many cases it is sufficient to modify one resistance, say a valve, but in general it is recommendable to vary several resistances at several points of the transmission path. This ensures a greater accuracy of the control which, since it can be effected at the various points by means of smaller variations, is less subjected to the occurrence of distortions during the control process.

Fig. 1 is a constructional example of a wireless duplex system for picture transmission. Figs. 2–5 represents single parts of this circuit. Fig. 6 illustrates certain relations which may be present in the case of disturbances. Fig. 7 shows a modified form of construction of the invention. Fig. 8 shows a modification of the interrupting means shown in Fig. 1. Fig. 9 shows a modification of certain of the connections shown in Fig. 1, II. Fig. 10 shows a modification of the connections shown in Fig. 5. Though the examples given relate to duplex systems, it will be seen from the following description that the invention may also be applied to unidirectional traffic from a sending station to a receiving station.

In Fig.1, I and II are two stations communicating with one another by wireless.

At the sending end of station I, a motor 1 drives the sending drum 2; 3 is a device designed for converting the light variations of the picture to be transmitted and exposed to the source of light, into variations of an electric current; 5 is a synchronization device of any known type, which is connected to the motor and sends synchronization currents to the receiving end. The currents emitted by 5 are simultaneously used as control currents which, having a constant sending amplitude which may be controlled by the instrument 6, maintain the intensity of the incoming useful currents. In the modulation device 7 the picture currents are impressed on a carrier current and pass together with the synchronization or control currents over the balancing circuit 8, line 9, balancing circuit 10, filter 11 to the wireless transmitter 12. 13 and 14 are simulating networks.

Between the filter 11 which allows the frequency of the generator and the signal frequencies to pass, and the transmitter 12, there is connected another generator for the control current which may be modulated with the aid of generator 29.

If, for instance, a frequency band of 600–2400 cycles per second is available for signalling currents, the generator 5 produces a frequency below this band of about 300 c. p. s. and the generator 15 a frequency above this band, i. e. of 2750 cycles per second. The generator 15 is connected to the transmitter 12 through a filter 16 and the contact 17 of a relay 18. If the relay is supplied from the generator 29 having for instance a frequency of 10 c. p. s. so as to interrupt the armature of the relay in its circuit, this gives rise to an oscillation which, besides the frequency 2750, covers the frequencies 2760, 2780, 2800, 2820 etc. as well as the frequencies 2740, 2720, 2700, 2680 etc. as modulation frequencies. The interruption can, of course, also be obtained in another way as shown in Fig. 8, i. e. by coupling a mechanical interrupter 290 with the axle of generator 29. The filter 16 is dimensioned so as to permit a band of desired width to pass, for instance the frequencies 2700–2800, whereas it suppresses the frequencies lying above or below this range. With the aid of the instrument 19, the control voltage can be kept at a well-defined standard value, that is 1 volt.

The receiver E at the opposite station II is designed for the reception of a frequency band up to 2800 c. p. s. This band is afterwards in a well-known manner split up by filters into the band comprising the signal and synchronization frequencies and the control frequency band from of 2700 up to 2800 c. p. s.

According to the balancing error between the cable line 20 and its simulating network 21 a greater or smaller portion of the control currents of 2700–2800 c. p. s. passes through the balancing circuit 22 and the transmitter 23 back to the station I where it is picked up by the receiver 24. The currents of these frequencies reach the relay device R over a potentiometer 25 and the filter 26, permitting only the frequencies within the range of 2700 and 2800 to pass. According to the intensity of the incoming currents, the sliding contact of 25 is shifted, so that the efficiency in the feed-back circuit 12, E, 22, 23, 24 is kept constant.

It may further be taken into account that the amplitudes of the component oscillations of the control frequency band decrease almost proportionally with the distance separating them from the mean frequency 2750. For this end the amplifiers should be given an opposite frequency characteristic. The inertia of the control device must in this case be sufficiently great to prevent the device from following the periodical fluctuations of the control oscillation lasting 0.1 second.

In this way the device becomes independent of the fluctuations in the transmission equivalent which in particular occur easily between a wireless transmitter and its receiver.

Figs. 3 and 4 show constructional examples for the relay device R. In both cases the alternating currents are supplied to a rectifier 29 over the lines 27 and 28.

Fig. 3 shows a form of construction in which use is made of two relays 301, provided with contact 310, and 302, provided with contact 320, with different sensitivity, the response current intensity of one of them i. e. 302 corresponding to a transmission efficiency which is somewhat superior to the required one, whereas the other 301 is more sensitive by a definite amount. In the local circuit of relay 302 a third relay 303, provided with contact 330, is provided, which, on the response of 302 breaks the local circuit of 301. The local circuits, by means of two electromagnetic couplings 306 and 307 connect the spindle T of the potentiometer 25 to the gear wheels 304, 305. The gear wheels are driven by the motor 308 through the wheel 309, in opposite directions of rotation in such a manner that when coupled to 305 the resistance tapped on the potentiometer is increased and when coupled to 304, it is reduced. If the incoming control voltage increases, the relay finally responds and thus also the relay 303, the spindle T is coupled to 304 and the incoming voltage is therefore reduced until 302 and consequently 303 are released. T is thereby again coupled to 305 and the transmission efficiency increased until 302 is again operated. The efficiency thus fluctuates round a value which is determined by the current intensity operating the relay 302.

Another form of construction of the control device which works with only one control relay is shown in Fig. 4. The motor 400 drives the toothed wheel 401, the toothed wheel 402 and consequently, through the differential gearing 403, 404, 405 the spindle T of the potentiometer 25. The driving device is thereby chosen in such a manner that it corresponds to an increase of the voltage tapped on the potentiometer. If this voltage exceeds a given amount, the relay 406 responds and closes the electromagnetic coupling 407. The spindle T is thereby screwed back again through the toothed wheels 408 and 409 and the differential gearing until the relay 406 drops its armature. By a sufficiently small graduation of the potentiometer, the control voltage can thus be maintained with any desired accuracy at a value which corresponds to the response current intensity of the relay 406.

The adjustment of the control voltage is preferably effected by calibration with the aid of the control generator 15 at the same station, in that a given fraction of its voltage is applied directly to the input 26 and the sensitivity of 302 or 406 adjusted until the potentiometer is set to the desired value. The attenuation of the entire circuit 10, 12, E, 22, 23, 24, 10 in Fig. 1 can also be regulated in the manner described, if the portion $a\,b$ is inserted at $c$.

The currents outcoming from the receiver E, and having frequencies below 2400 cycles per second, that is the signal frequencies and the control and synchronization frequencies produced by 6 enter at the station II through a filter 30, the line 20 of a cable and pass from there through the balancing circuit 31 to the amplifier 32. Behind this amplifier the two types of current are separated. The filter 33, for instance a high-pass filter transmits only the useful currents, whereas the filter 34, for instance a low-pass filter, transmits only the control and synchronization currents. These are, in part, employed for adjusting the speed of the motor 35, which drives the picture drum 36. The light sensitive film on this drum is exposed with the aid of a light control device 37, which, in turn, is acted on by the signal currents traversing the filter 33. Another portion of the currents of 300 cycles per second is used for controlling the transmission efficiency of several amplifiers. For this end, it acts on a rectifier valve 38 in whose plate circuit there is inserted a resistance 39, at which one observes a variable potential drop. The resistance 39 may, of course be replaced, as shown in Fig. 9, by an equipment comprising a condenser 390 and resistance 39, in order to cause the current fluctuations at an output resistance to correspond to a certain temporal mean value of the currents flowing through the filter 34. A portion of the continuous voltage occurring across 39 acts as bias in the grid circuit of the amplifier valve 32 and thus controls its transmission efficiency. Another portion is supplied via the cable line 40 to the receiver E, in order to control the transmission efficiency of this receiver.

The receiver E is shown in detail in Fig. 2. The lines 41 and 42 are connected to the receiving aerial 43 and supply a H. F. amplifier with high-frequency current through the input transformer 44. The modulation frequencies gained in the detector 46 which, in the example discussed, are within the range of 300 to 2800 cycles per second, are once more amplified in the L. F.-amplifier and with the aid of the output transformer 48, applied over the lines 49 and 50 to the balancing circuit 22.

The H. F.-amplifier 45 and the L. F.-amplifier 47 are supplied with a variable biasing potential from the resistance 51, connected at the extremity of the line 40. The transmission efficiency of the three amplifiers 45, 46 and 47 is a function of the potential drop at the resistance 51, connected at the end of the line 40, and the system is thus controlled in such a manner that the transmission efficiency between the sending end of station I and the receiving end of station II does not involve any disturbing fluctuations.

Another type of control is illustrated for the traffic between station II and station I. The picture transmitting device at station II corresponds to that at station I. It comprises a generator 60 for the production of synchronization and control currents, which permits of controlling the speed of the motor 61, driving the transmitting drum 62. The amplitude is kept constant by means of the instrument 63. The signal currents produced in the light sensitive cell modulate a relatively low carrier frequency of about 1500 cycles per second in the modulator 65, so that one obtains a frequency band of 600–2400 c. p. s. These currents combine with the current of 60 of 300 c. p. s. derived from the generator, the amplitude of which is kept constant, and pass over the balancing circuit 31, line 20, filter 30 and balancing circuit 22 to the transmitter 23. Here they modulate a high-frequency carrier wave and are transmitted to the receiver 24. From there the rectified currents pass via 25, 70, 10 and 9 to the balancing circuit 8, in the secondary circuit of which the currents are branched.

The filter 71 allows only the useful frequencies to pass, which are conveyed to an amplifier valve 72. The transmission equivalent of this amplifier is to be modified in accordance with the energy picked up. The filter 73 (for instance a low-pass filter) allows only the auxiliary frequency to pass which is, in part, conveyed to the motor driving the picture drum, for synchronization purposes, in part, rectified within a valve 76. The A. C. portion of the plate current passes through the condenser 77, the D. C. portion through the resistance 78. The potential drop, which is produced at 78 and increases with the amount of energy picked up by the aerial, is utilized as bias for the valve 72.

The greater the potential drop at 78, the more the grid bias is displaced to the negative and the smaller is the transmission efficiency of the valve 72. A suitable selection of the resistance 78 permits of obtaining that the useful current picked up behind the valve 72 is always proportional to the modulating current at the transmitting end, independently of the fluctuations in the transmission equivalent between transmitter and receiver.

The resistance can also be situated in the grid circuit of a valve placed in front of the branching off point for the useful and control currents, for instance in the grid circuit of a further amplifier valve connected in series.

In such a case, a linear relation between the amplitudes of the control currents and the variations of the transmission efficiency of the receiving circuit may be dispensed with.

Hence the control device can also be arranged in such a manner that it responds only when exceeding a given threshold value and then effects the control until the amplitude of the auxiliary frequency, and, consequently also the amplitude of the useful current, which is simultaneously modified, has completely or practically completely reached its original value. The response of the control device at a given limit is preferably ensured by starting a grid current in a thermionic valve.

Fig. 5 shows a constructional example of this device; the currents flow from the line 9 through the differential transformer 8 to an amplifier valve 501 at which the transmission efficiency of the receiving circuit is adjusted, in whose output circuit there is connected a resistance 502, behind which the two types of current are separated. The filter 503 only transmits the useful currents, whereas the filter 504, for instance a low pass filter, only transmits the control and synchronization currents. These are carried to a resistance 505 lying in the grid circuit of an auxiliary valve 506, the grid bias of this valve being chosen in such a manner that from a given amplitude of the control currents flowing from 504 to the resistance 505, a grid current is started in the valve 506. This grid current produces in the connected grid circuit of the amplifier valve 501 a potential drop which makes the grid more negative and is the greater the greater the amplitude of the control current acting on the grid circuit of 506. The transmission efficiency of the receiving circuit is thereby reduced. In the connection between the grid circuit of the amplifier valve 501 and the auxiliary valve electric selective means should be provided in order to prevent the control frequency itself from passing into the grid circuit of the amplifier valve, where it might heterodyne with the useful currents (superpose itself on the useful currents).

The grid circuit of the valve 501, instead of being connected to the grid circuit of the auxiliary valve 506 can also be connected to its plate circuit as shown in Fig. 10. In this case the potential drop used for displacing the grid (bias) of 501 is not produced directly by the grid current of 506 but by the plate current change resulting therefrom.

The control of only one valve referred to, can in many cases be sufficient, but in general it is preferable to effect the control of the transmission efficiency by displacing the grid biases of several amplifier valves.

The control of the transmission efficiency is achieved in the manner described in that at a given point, say behind the L. F. amplifier of the receiver, as shown in Fig. 1 II at 34 and 38, the control current is filtered out and rectified. The rectified voltage is used for modifying the transmission equivalent of the amplifiers as shown in Fig. 2. For that reason the amplifiers can only be controlled when certain fluctuations in the intensity of the incoming control current and, consequently of the rectified voltage, are permitted. Though within a certain range the fluctuations of the overall transmission efficiency cause practically no disturbance, it is nevertheless preferable to keep them as small as possible. According to the invention, this is achieved in that in order to obtain the same variation in the overall transmission gain a smaller variation in the rectified voltage will be sufficient when distributing the control over several points than in the case of the control being effected at one point only. For that reason, the invention increases the accuracy of the control.

Further advantages are also involved in connection with the fact that the transitional voltages can be kept low. Owing to the variable grid bias it is not always possible to work the amplifiers at the most favourable points of the characteristic lines and if the control is effected in only one valve, that is to say by relatively large displacements of the grid potential, it may easily occur, that the working point will be shifted to a strongly curved portion of the characteristic line, so as to produce strong upper harmonics. Finally, it is possible, for instance, if the control of a valve is effected in the high-frequency portion or stage, that the amplification in the first stages becomes so great, as to cause the subsequent valves to be overrun. For similar reasons it is in most cases recommendable to deal with different transitional voltages for the various valves, the voltage of a valve, for instance, which is only slightly controlled can be displaced to a larger extent without any risk of distortion, than the grid voltage of a highly controlled valve. Various arrangements may be used for this end.

Another form of construction is shown by Fig. 7. It illustrates part of a transmission system in which four wires are used for transmission purposes, that is the double line 701 for the transmission from the left to the right and the double line 702 for that from the right to the left. The control currents are produced in the generator 703 and pass over the transformer 704 and the resistance 705 to the contacts of a switch U having three positions: In practice it is thrown over to the left, position III. The control currents flow through the contact 706, the lines 707, 708, the resistance 745, the thermo-couple 711, the resistances 712, 713 and the contact 714, the resistance 705 back to the transformer 704. The potential drop at the resistance 745 lies across the series resistance 710 and the double line 702. The filter 744 prevents the control currents from passing to the left through the double line 702. Through the control resistance 715, the antidistortion device 716, the input transformer 717, the amplifier valve 718 and the output transformer 719 they arrive amplified at the distant receiving station. The letters G−H and +P designate the relative connections to the grid-filament and plate batteries. The minus pole of the plate battery and the plus pole of the filament or heating battery are grounded in common. In parallel with the two other terminals of the thermo-couple 721 there is a resistance 720 and the measuring instrument 721 is connected across the contacts 722 and 723 of the switch U. The instrument 721 permits of maintaining the amplitude of the transmitted control current.

The distant station is equipped with a similar transmitter for control currents as the station described. Hence signal currents mixed up with control currents come from the left over the double line 701 and pass through the resistance circuit 724 and the input transformer 725 to a valve set. The resistance circuit 724 reduces the amplitude to such an extent that the distortions due to the non-linear valve characteristic may be kept small. The valve set consists of three valves 726, 727 and 728 which are coupled through condensers and resistances in a well-known manner. This valve set is preferably adjusted so, that, in the normal condition it produces neither, together with the resistance circuit 724, an amplification nor an attenuation of the signal and control currents. These currents leave the valves through the output transformer 729 and pass via a control resistance 730 and an anti-distortion device 731 to the input transformer 732 of an amplifier 733. Behind the output transformer 734 of the amplifier the currents are separated, that is the signal currents pass on the right through a filtering circuit 735 in the double line 701; and the control currents are carried to a wave filter 737 through a resistance circuit 736 and act through the input transformer 738 on an amplifier valve 739. The amplified currents are conveyed, with the aid of a transformer 740, to a three-electrode valve 741, whose grid and plate are interconnected so that it acts as a two-electrode valve rectifying the impressed alternating currents. The fluctuations of the rectified current are removed in a wave filter 742, thus producing a D. C. voltage to occur at a resistance 743 the intensity of which depends on the intensity of the alternating control voltages applied to the electronic valve 739. The resistance 743 is connected to the grids of the valves 726 and 727.

The efficiency of the arrangement is as follows:

At the distant station control currents of constant amplitude are emitted, which enter, however, the resistance circuit with different amplitudes, if the transmission conditions between the two stations are modified.

Supposing, for instance, that the control currents arrive more weakened than under normal conditions, in this case the valve 739 is supplied with voltages which are weaker than the normal ones and the D. C. voltage at the resistance 743 is consequently reduced. The resistance 743 is connected so as to provide a negative bias for the grids of the valves 726 and 727. The reduction of this bias permits of working the valves 726 and 727 within a range of greater steepness of the curve and they begin now to act as amplifiers.

On the other hand, if the received control currents are stronger than is normally the case, a higher negative bias is produced at the resistance 743 for the valves 726 and 727, so that they have an attenuating effect. In this way it is possible to balance the differences in the transmission equivalent between the distant sending station and the receiving station.

The switch S serves for testing the adjusting device and permits also of applying to the resistance circuit 724 part of the control voltage produced in the generator 703 and tapped on the resistance 745 in order to adjust the control device, to a definite standard value.

The switch U has two further positions designed for calibrating the thermo-couple and for adjusting the standard voltage of the control current transmitter 703. In the position I the switch U is thrown to the right, and a current passes from the minus-pole $-Z$ of the central battery over the contact 746, the resistances 747 and 748, ground back to the plus pole of the central battery. From the common point of the two resistances 747 and 748, a current passes over the contact 749 and the resistances 713, 712 through the upper part of the thermo-couple 711, the resistance 745 line 708 back to ground. The measuring instrument 721 is thereby connected across the contacts 750 and 751 in parallel with the resistance 712. The variation of the resistance 748 permits therefore of adjusting the direct current, traversing the thermo-couple 711, to a definite standard value.

In the position II of the switch U the D. C. circuit remains the same for the upper part of the thermo-couple, but the instrument 721 as in the position III, is connected in parallel with the two lower terminals of the thermo-couple 711 and with the control resistance 720. The control resistance 720 is adjusted so as to cause the instrument 721 to indicate a definite standard value. The calibration of the thermo-couple having been achieved in such a manner, it is now possible, in the position III of switch U, to adjust the standard value for the control voltage at the generator 703 with the aid of the thermo-couple 711 and the D. C. instrument 721.

We claim:

1. In a transmission system, wherein a signaling frequency and a control frequency are simultaneously transmitted to a receiver, the method of automatically regulating the transmission efficiency of the receiver which consists in periodically varying the control frequency between predetermined limits and applying said control frequency to said receiver.

2. In a transmission system, wherein a signaling frequency and a control frequency are simultaneously transmitted to a receiver, the method of automatically regulating the transmission efficiency of the receiver which consists in periodically varying the control frequency at the rate of one-tenth of a second or less between two predetermined limits and applying said control frequency to said receiver.

3. In a transmission system, wherein a signal current and a control current oscillating at different frequencies are simultaneously transmitted to a receiving system, the method of automatically regulating the transmission efficiency which consists in interrupting the control current at a rate of one-tenth of a second or less and applying such interrupted current to said receiving system.

In testimony whereof we affix our signatures.

KARL KÜPFMÜLLER.
FRANZ TUCZEK.
HANS MAYER.